United States Patent [19]

Yang

[11] Patent Number: 5,504,724
[45] Date of Patent: Apr. 2, 1996

[54] OPTICAL PICK-UP SYSTEM WITH SERVO USING REFLECTION PLATE HAVING APERTURE

[75] Inventor: Keun Young Yang, Kwacheon, Rep. of Korea

[73] Assignee: Goldstar Co., Ltd., Seoul, Rep. of Korea

[21] Appl. No.: 70,758

[22] Filed: Jun. 3, 1993

[30] Foreign Application Priority Data

Jun. 4, 1992 [KR] Rep. of Korea ............... 1992-9697

[51] Int. Cl.⁶ ..................................................... G11B 7/09
[52] U.S. Cl. .................................. 369/44.24; 369/44.32; 369/44.42
[58] Field of Search ........................... 369/44.11, 44.12, 369/44.23, 44.24, 44.32, 112, 109, 117–118, 44.42; 250/201.5; 385/14, 36; 359/19

[56] References Cited

U.S. PATENT DOCUMENTS

| | | |
|---|---|---|
| 3,997,715 | 12/1976 | Elliott ................................. 369/44.24 |
| 4,497,534 | 2/1985 | Sincerbox ........................... 359/301 X |
| 4,737,946 | 4/1988 | Yamashita et al. ............... 250/201.5 X |
| 4,904,856 | 2/1990 | Nagahama et al. ................. 250/201.5 |
| 4,907,847 | 3/1990 | Onayama et al. .  |
| 4,929,044 | 5/1990 | Arimoto et al. .  |
| 4,929,823 | 5/1990 | Kato et al. ........................... 250/201.5 |
| 4,945,527 | 7/1990 | Sunagawa ........................... 369/44.12 |
| 5,016,954 | 5/1991 | Onayama et al. .  |
| 5,105,403 | 4/1992 | Kando et al. ........................ 369/44.12 |
| 5,111,448 | 5/1992 | Komma et al. ..................... 369/44.23 |
| 5,200,946 | 4/1993 | Fritz ................................. 369/44.12 X |

*Primary Examiner*—W. R. Young

[57] ABSTRACT

Optical pick-up system and method for accurately reading information recorded on an optical disc. The invention makes it possible to determine the kind of an error occurring upon reading information recorded on an optical disc by light beams from a light source, by using error detectors, and to correct accurately the error by driving a focusing lens, thereby capable of rapidly correcting errors such as tracking/focusing errors, providing a light and compact construction and improving a reliance, so as to solve problems of a high sensitivity to variations, a poor assembling ability, a bulky construction and a degraded reliance, encountered in optical devices which have been generally used for reading information recorded on optical discs.

1 Claim, 8 Drawing Sheets

SIGNAL LEVEL
$S_1' = 0$
$S_2' \neq 0$

SIGNAL LEVEL
$S_1' \neq 0$
$S_2' = 0$

OPTICAL PICK-UP SYSTEM WITH SERVO USING REFLECTION PLATE HAVING APERTURE

FIELD OF THE INVENTION

The present invention relates to an optical pick-up system and method, and more particularly to an optical pick-up system and method capable of accurately reading information recorded on an optical disc.

BACKGROUND OF THE INVENTION

Recently, the use of optical discs such as compact discs and laser discs have been greatly increased. In the future, these optical discs will be used in all technical fields, by virtue of their advantages of a capability of storing a lot of information and convenience of use.

However, optical discs require an optical pick-up device for reading information recorded thereon.

Moreover, optical devices which have been generally used for reading information recorded on optical discs are very sensitive to vibration. As a result, it is very difficult to read accurately information recorded on optical discs at places where severe vibrations occur.

Referring to FIG. 1, there is illustrated a general optical pick-up device. As shown in FIG. 1, the optical pick-up device comprises a semiconductor laser diode 21 as a light source, a half mirror 22 positioned downstream of the laser diode 21 and adapted to reflect light beams emitted from the laser diode 21 at a predetermined angle, and a 45° mirror 23 positioned downstream of the half mirror 22 and adapted to reflect the light beams reflected from the half mirror 22 at an angle of 45°. Positioned downstream of the 45° mirror 23 is a focusing lens 24 which feeds the light beams reflected from the 45° mirror 23 to an optical disc 25 so that information recorded on the optical disc 25 can be read. The optical pick-up device also comprises a condensing lens 26 positioned at a path along which light beams reflected from the optical disc 25 is reflected. The condensing lens 26 is adapted to condense the light beams reflected from the optical disc 25. Downstream of the condensing lens 26, a photodetector 27 is also positioned, so as to sense light beams condensed by the condensing lens 26.

Operation of the optical pick-up device with the above-mentioned arrangement will now be described.

First, light beams emitted from the laser diode 21 is reflected by the half mirror 22 so that they are fed to the 45° mirror 23. The light beams fed to the 45° mirror 23 are then reflected by the 45° mirror 23 at an angle of 45°, so as to be fed to the focusing lens 24. The focusing lens 24 focuses the light beams incident thereon and then transmits them to the optical disc 25. The light beams incident on the optical disc 25 are then reflected with different reflection amounts, according to forms of information recorded on the optical disc 25.

The light beams reflected from the optical disc 25 are fed to the focusing lens 24 which, in turn, converts them into parallel light beams. The parallel light beams are then fed to the condensing lens 26, so as to be condensed. The condensed light beams are detected by the photodetector 27. The light beams reflected by the optical disc 21 have different intensities, according to information recorded on the optical disc 21. By virtue of such a difference in light amount, the recorded information can be read.

However, such a general optical pick-up device has a bulky optical system, since elements thereof should be arranged at individual positions. As a result, there is a difficulty in applying such an optical pick-up device to appliances which are on a compacting trend. Moreover, the assembling of elements at their individual positions results in a lengthened adjusting time and a poor ability in assembling. Consequently, the manufacture cost and the poor product rate are increased.

SUMMARY OF THE INVENTION

Therefore, the present invention has been made in view of the above-mentioned problems encountered in the prior art and an object of the invention is to provide an optical pick-up system and method capable of reading accurately information recorded on an optical disc.

Another object of the invention is to provide an optical pick-up system and method capable of reading accurately information recorded on an optical disc, even when the optical disc is subjected to vibrations.

Another object of the invention is to provide an optical pick-up system and method capable of reading accurately information recorded on an optical disc, by sensing an error caused by vibrations applied to the optical disc and correcting it.

Another object of the invention is to provide an optical pick-up system capable of improving an ability in assembling and having a compact and light construction, as compared with general ones.

In accordance with one aspect, the present invention provides an optical pick-up system for reading information recorded on an optical disc, said system comprising: a light source; information reading means for reading said information recorded on said optical disc, by using light beams emitted from said light source; error correcting means for detecting an error occurring when said information reading means reads the information and correcting said error; and supporting means for providing optical paths for the information reading means and said error correcting means and supporting both the information reading means and the error correcting means.

In accordance with another aspect, the present invention provides an optical pick-up method for reading information recorded on an optical disc, said method comprising the steps of: reading said information recorded on said optical disc by using light beams emitted from a light source; detecting an error occurring upon reading the information; and correcting said detected error.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
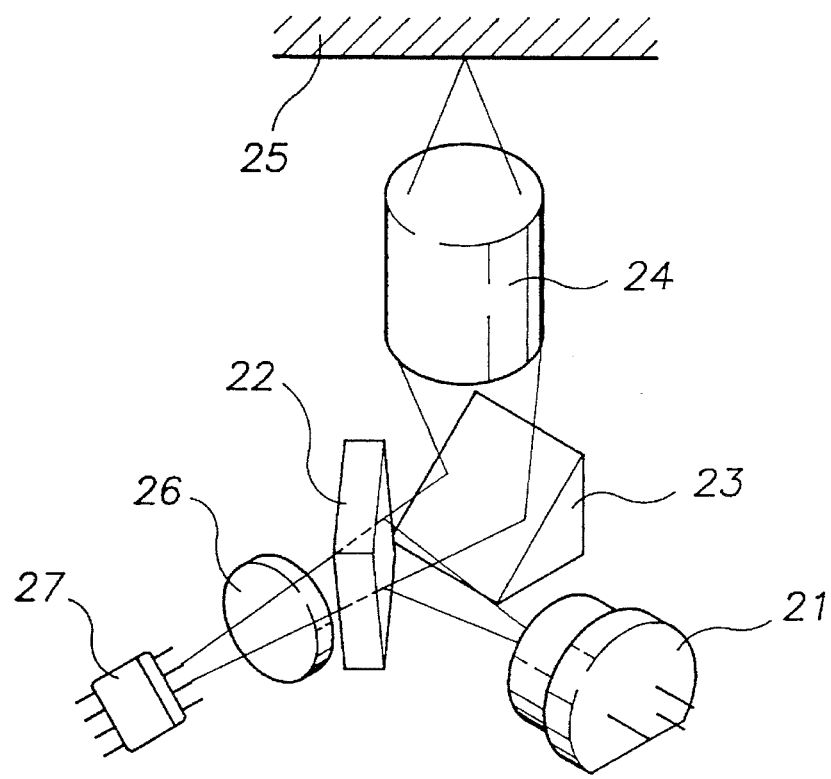
FIG. 1 is a schematic perspective view of a general optical pick-up device.
Figure 2:
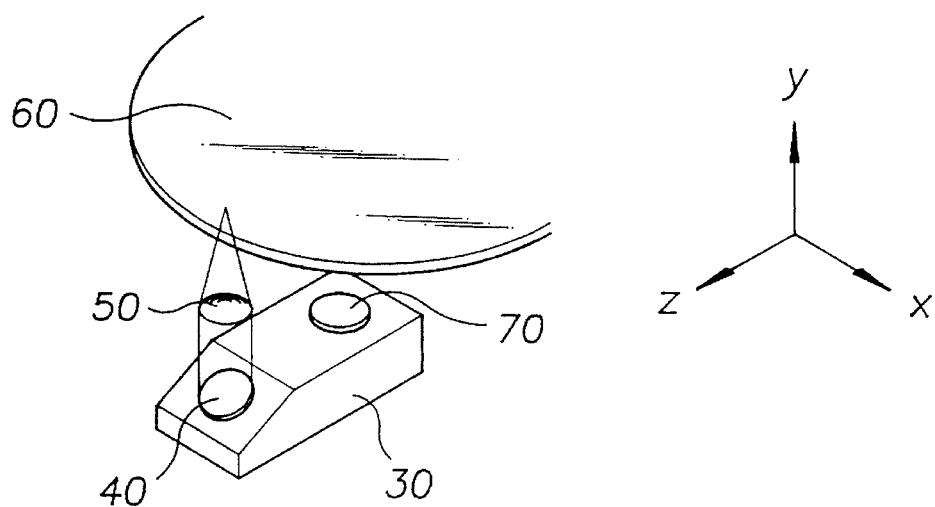
FIG. 2 is a schematic perspective view of an optical pick-up system according to the present invention.
Figure 3:
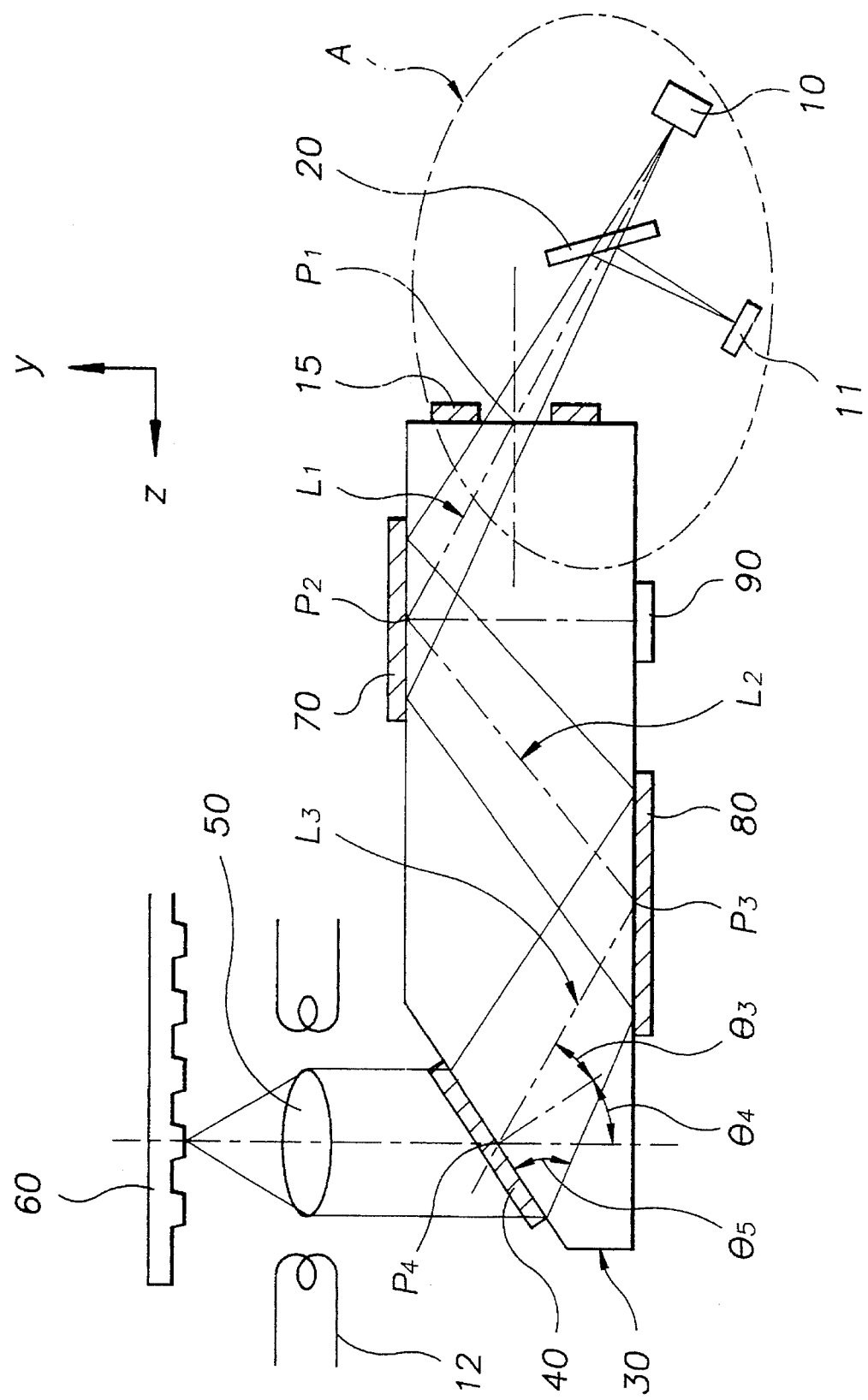
FIG. 3 is a schematic sectional view of the optical pick-up system according to the present invention.

Referring to FIGS. 2 and 3, there is illustrated an optical pick-up system in accordance with an embodiment of the present invention.

As shown in FIGS. 2 and 3, the optical pick-up system comprises a laser diode 10 as a light source, a beam splitter 20 for transmitting a part of light beams emitted from the laser diode 10 therethrough and reflecting the remaining light beams therefrom, and a prism 30 for receiving the light beams transmitted through the beam splitter 20. Attached to the prism 30 is a first mirror 70 which is adapted to reflect the light beams incident on the prism 30 at a predetermined angle. The optical pick-up system also comprises a second mirror 80 for reflecting the light beams reflected by the first mirror 70 at a predetermined angle and a collimating hologram 40 for converting the light beams reflected by the second mirror 80 into parallel light beams. Positioned downstream of the second mirror 80 is a focusing lens 50 which is adapted to focus the parallel light beams emerging from the collimating hologram 40 and feed them to an optical disc 60. An actuator 12 is also provided for shifting the focusing lens 50. Of course, the provision of the actuator 12 may be omitted in some cases.

Attached to the prism 30 are a three-component photodetector 11, a reflection plate 15 and a two-component photodetector 90, all of which constitute means for sensing light beams reflected from the optical disc 60 and determining whether a tracking error or a focusing error has occurred.

Figure 5:
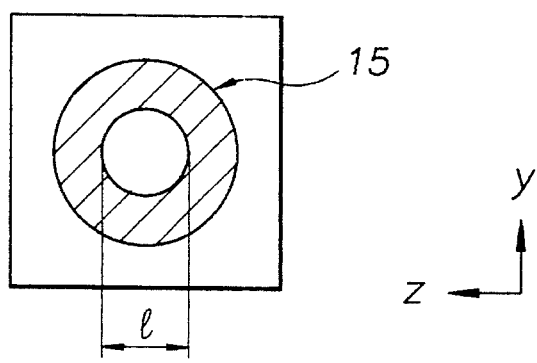
FIG. 5 is a schematic sectional view of a reflection plate according to the present invention.

The reflection plate 15 is attached to a front surface of the prism 30 and is of a disc provided with an opening having a diameter l, as shown in FIG. 5.

Figure 4A:
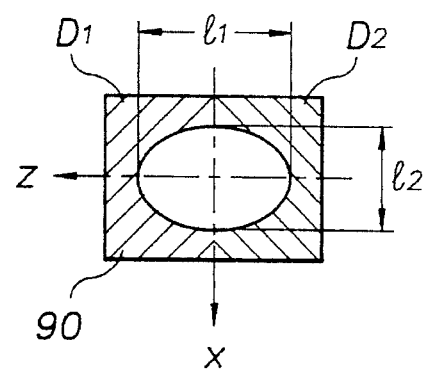
FIG. 4A is a schematic sectional view of a two-component photodetector according to the present invention.

As shown in FIG. 4A, the two-component photodetector 90 comprises two photodetector components $D_1$ and $D_2$ divided from each other with reference to a x-axis corresponding to a x-axis (FIG. 3) on which a point $P_2$ is positioned. The two-component photodetector 90 also has a central opening shaped into an ellipse having a z-axis (major axis) length $l_1$ identical to a width $L_8$ of FIG. 6 ($l_1=L_8$) and a x-axis (minor axis) length $l_2$ identical to the diameter l of the opening of reflection plate 15 ($l_2=l$).

Figure 4B:
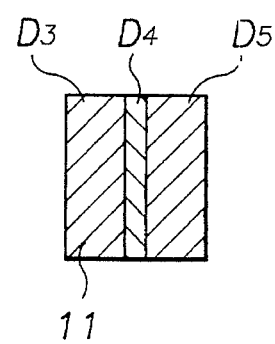
FIG. 4B is a schematic sectional view of a three-component photodetector according to the present invention.

As shown in FIG. 4B, the three-component photodetector 11 comprises three photodetector components $D_3$ to $D_5$, for example, three photodetectors. Sizes of the photodetector components are determined as follows.

That is, the sizes of photodetector components $D_3$ and $D_5$ are determined by taking into consideration magnitudes of errors such as a tracking error and a focusing error. The size of photodetector component $D_4$ is determined by taking into consideration a focusing point formed when no error has occurred.

Figure 7:
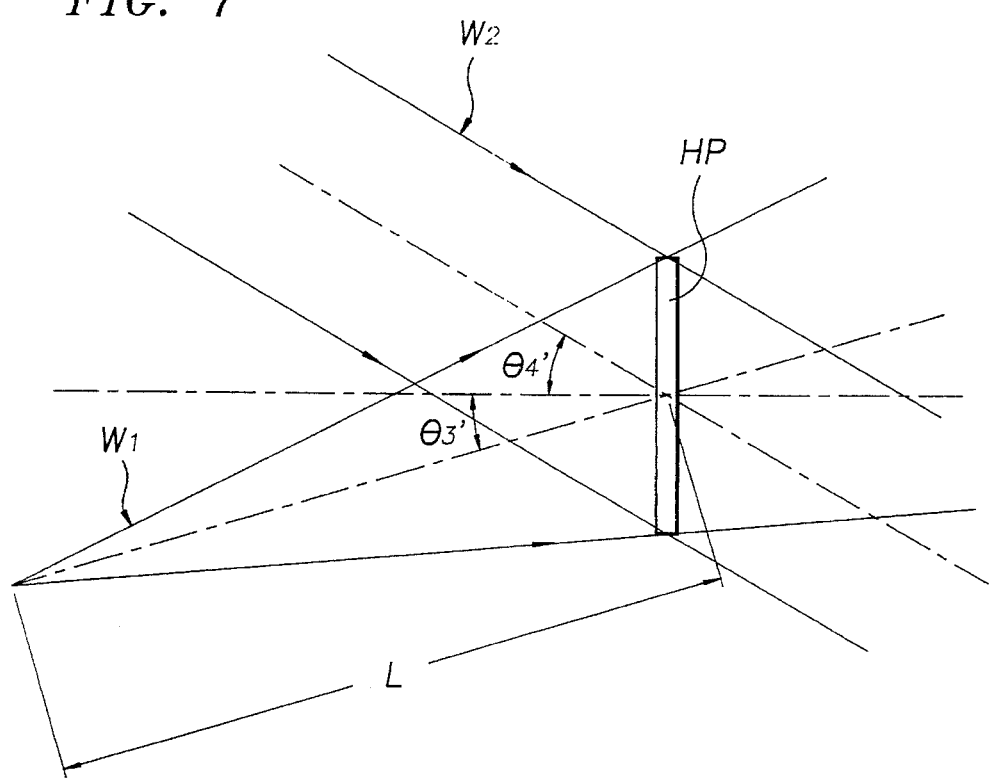
FIG. 7 is a schematic view for explaining a design for a hologram according to the present invention.
Figure 8:
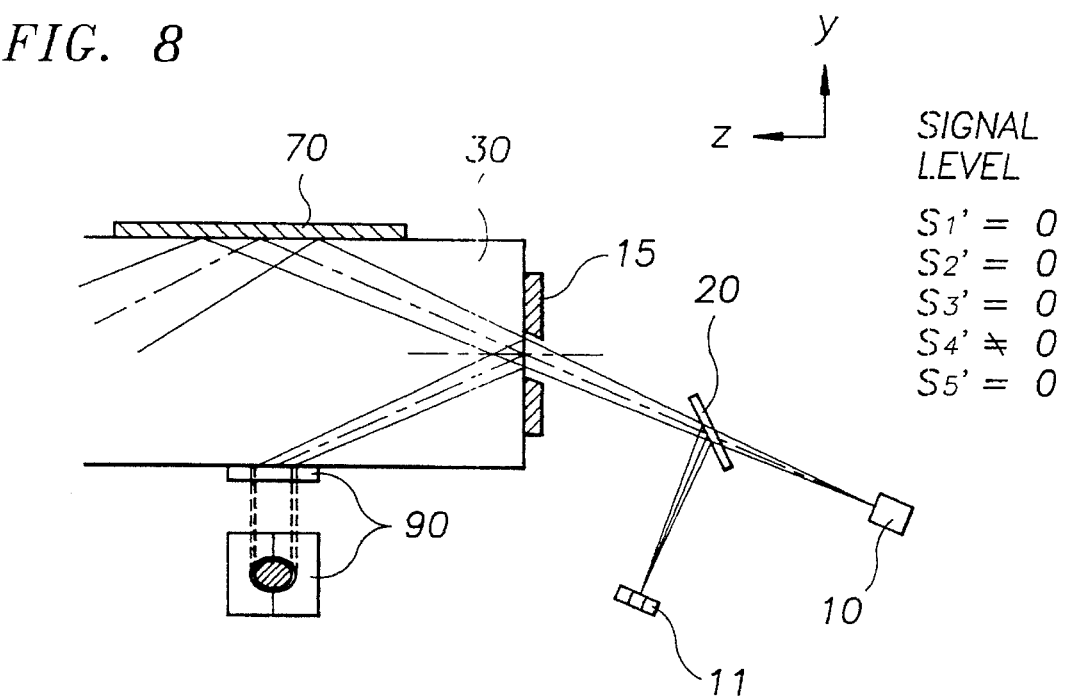
FIG. 8 is a schematic sectional view illustrating optical paths when no error such as a tracking error or a focusing error has occurred.
Figure 9:
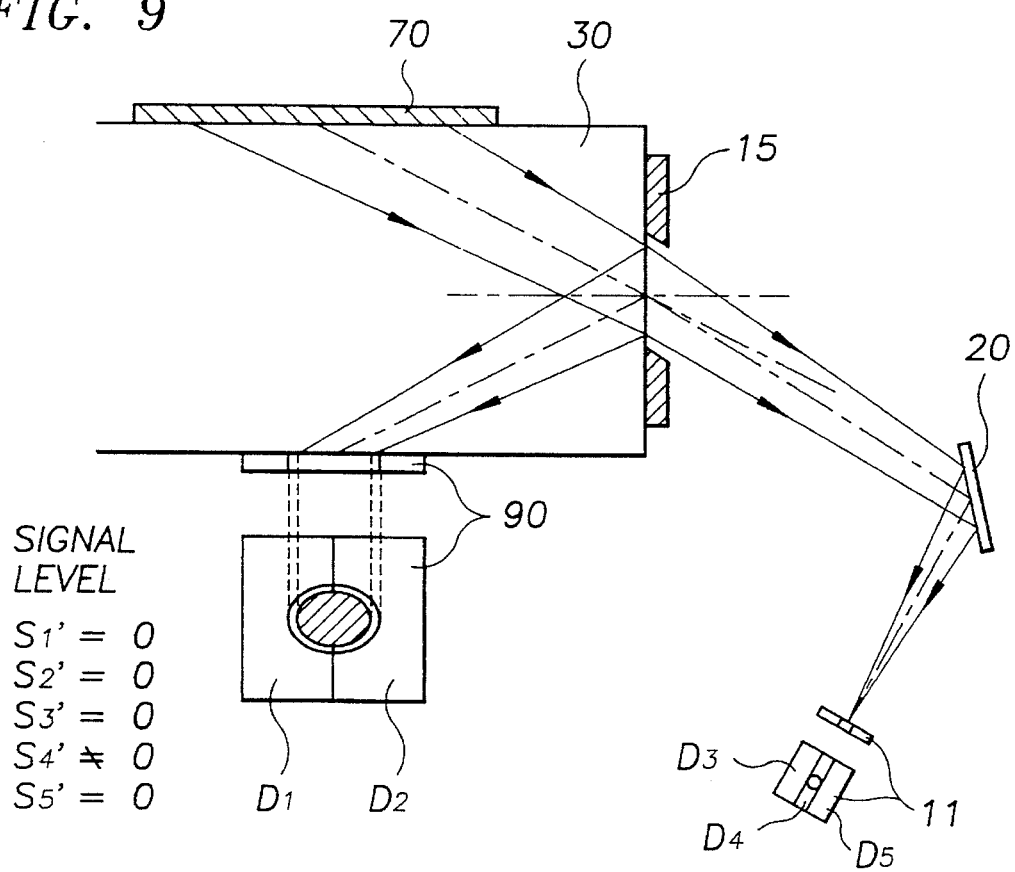
FIG. 9 is a partial enlarged view of FIG. 8.

The collimating hologram 40 comprises a holographic plate HP which is designed to receive diverging spherical waves $W_1$ emitted at a place spaced a distance L apart from the holographic plate HP and at an angle $\theta_3'$ with respect to a line normal to the holographic plate HP and parallel waves $W_2$ emitted at an angle $\theta_4'$ with respect to the line normal to the holographic plate HP, as shown in FIGS. 3 and 7. The design of the holographic plate HP is made so that its parameters satisfy the following conditions:

$$\theta_3' < 45°,$$

$$\theta_3' = \theta_3,$$

$$\theta_4' = \theta_4, \text{ and}$$

$$L = L_1 + L_2 + L_3 + L_4$$

Figure 6:
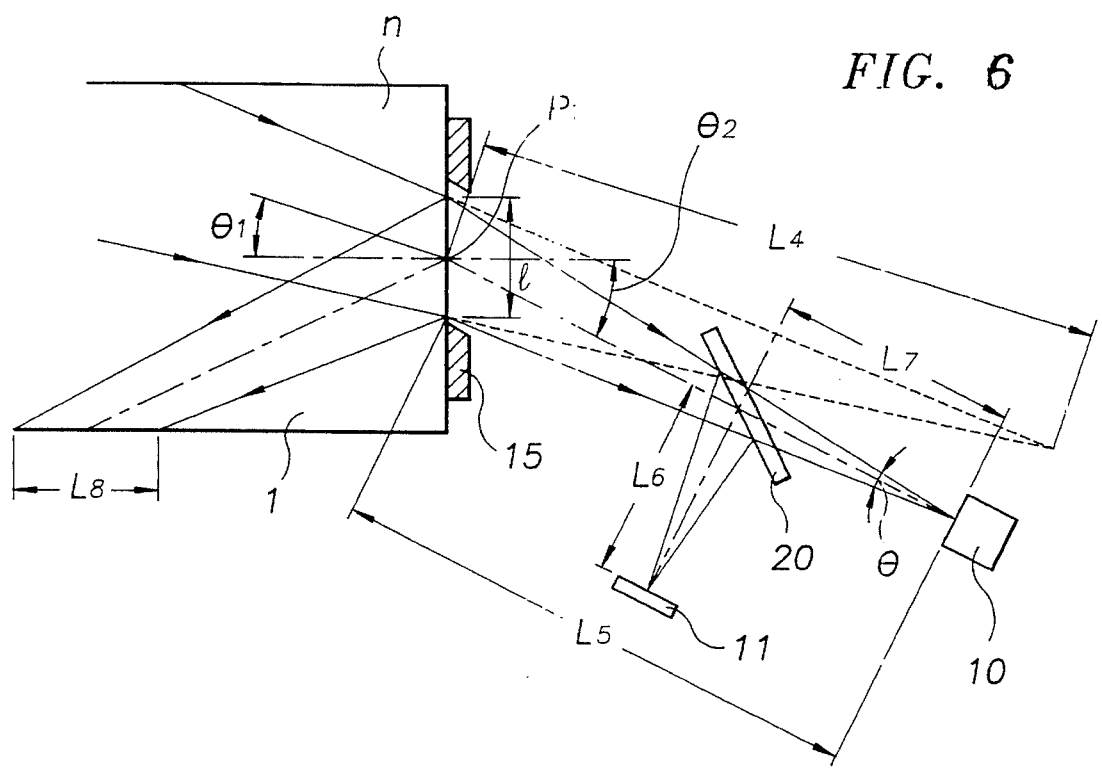
FIG. 6 is an enlarged view of a portion A of FIG. 3.

Also, other parameters shown in FIGS. 3 and 6 should satisfy the following conditions:

$$L_6 = L_7,$$
$$\theta_4 + \theta_5 = 90°, \text{ and}$$

$$1 \geq \frac{L_4 \cdot \sin(\theta/2)}{\cos(\theta_2 + \theta/2)}$$

Operation of the optical pick-up system with the above-mentioned arrangement will now be described.

Light beams emitted from the laser diode 10 are fed, via the beam splitter 20, to the wave guide prism 30 at an incident angle $\theta_2$, as shown in FIGS. 3 and 6. In the prism 30, the incident light beams are refracted at a refraction angle $\theta_1$ expressed by the following equation, by virtue of the difference in refractive index between the prism 30 and surrounding air.

$$\theta_1 = \sin^{-1}\left(\frac{1}{n}\sin\theta_2\right)$$

The beams refracted at the angle $\theta_1$ are then fed to the first mirror 70 which, in turn, reflects the beams toward the second mirror 80. By the second mirror 80, the beams are then fed to the collimating hologram 40 at an incident angle $\theta_3$. The light beams incident on the collimating hologram 40 are reproduced in the form of parallel light beams with a diffraction angle $\theta_4$. The parallel light beams are then fed to the focusing lens 50 which, in turn, focuses the incident parallel light beams onto the optical disc 60.

The light beams incident on the optical disc 60 are reflected from the optical disc 60 to be fed back along an optical path reverse to an original optical path extending from the beam splitter 20 to the optical disc 60. That is, the light beams reflected by the optical disc 60 are fed to the focusing lens 50 in which they are converted again into parallel light beams. The parallel light beams enter the collimating hologram 40 at an incident angle $\theta_3$, so that they are reproduced in the form of light beams with a diffraction angle $\theta_4$. The reproduced light beams are reflected by the second mirror 80 and then by the first mirror 70. Thereafter, a part of the light beams reflected from the first mirror 70 enter the beam splitter 20 while the remaining light beams enter the two-component photodetector 90. The light beams incident on the beam splitter 20 are then reflected toward the three-component photodetector 11.

The three-component photodetector 11 receives the light beams and senses them. The light beams detected by the three-component photodetector 11 corresponds to the information recorded on the optical disc 60. Accordingly, the information recorded on the optical disc 60 can be read by analyzing the light beams.

The above description has been made, assuming that the optical disc has not been subjected to a poor smoothness and a vibration, during the operation of the optical pick-up system. Where information recorded on optical discs are read by optical pick-up systems, however, focusing errors or tracking errors occur frequently, due to a poor smoothness of discs or external vibrations.

The optical pick-up system of the present invention corrects such errors so that information can be accurately read. An accurate reading of information achieved by the optical pick-up system of the present invention is carried out as follows.

First, cases where focusing errors occurred during the operation of the optical pick-up system will be described, in conjunction with FIGS. 10A to 10D.

Figure 10A:
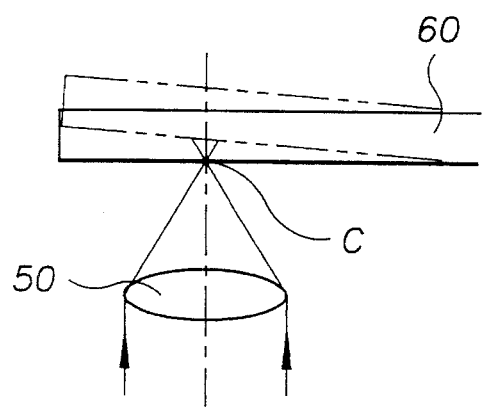
FIGS. 10A to 10D are schematic views for explaining focusing errors.
Figure 10B:
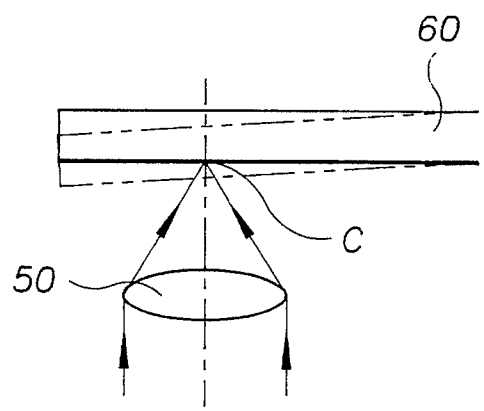
Figure 10C:
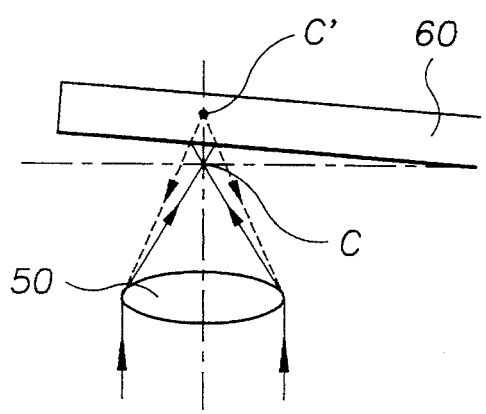
Figure 10D:
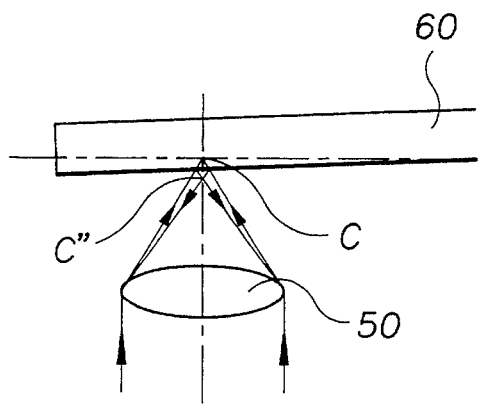
Figure 14:
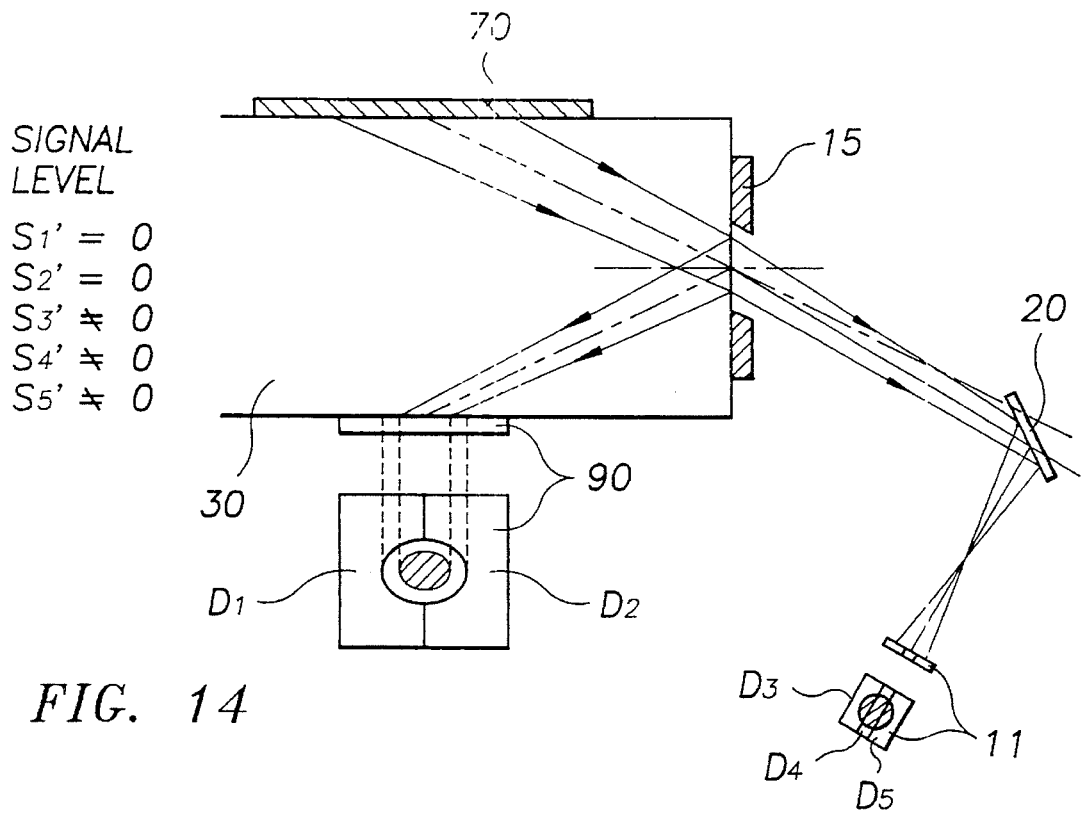
FIG. 14 is a schematic sectional view illustrating optical paths formed at conditions of FIGS. 10A and 10C.

Such focusing errors are generated when the optical disc 60 moves away from or toward the focusing lens 50, as shown in FIG. 10A or FIG. 10B, respectively. Where the optical disc 60 moves away from the focusing lens 50, a reflection point C moves to a point C', as shown in FIG. 10C. On the other hand, where the optical disc 60 moves toward the focusing lens 50, a reflection point C moves to a point C'', as shown in FIG. 10D. Assume that $S_1$ and $S_2$ are optical signals detected by the photodetector components $D_1$ and $D_2$, respectively and that $S_3$, $S_4$ and $S_5$ are optical signals detected by the photodetector components $D_3$, $D_4$ and $D_5$, respectively. When the optical disc 60 moves away from the focusing lens 50, as shown in FIG. 10C, light beams are focused in front of the three-component photodetector 11, as shown in FIG. 14. This is because the reflection point C moves to the point C'. In this case, the photodetector components $D_3$ to $D_5$ of the three-component photodetector 11 detect the optical signals $S_3$ to $S_5$ and thus output photodetecting signals $S_3'$ to $S_5'$, respectively. In this case, light beams passing through the reflection plate 15 have a size smaller than the diameter l of the opening of reflection plate 15. As a result, the size of light beams incident on the two-component photodetector 90 becomes small, so that the photodetector components $D_1$ and $D_2$ of the two-component photodetector 90 can not detect the optical signals $S_1$ and $S_2$. Therefore, the optical pick-up system recognizes the above case as a case that the optical disc 60 has moved away from the focusing lens 50 and thus activates the actuator 12 for shifting the focusing lens 50, so that it corrects the focusing error, so as to operate normally.

Figure 15:
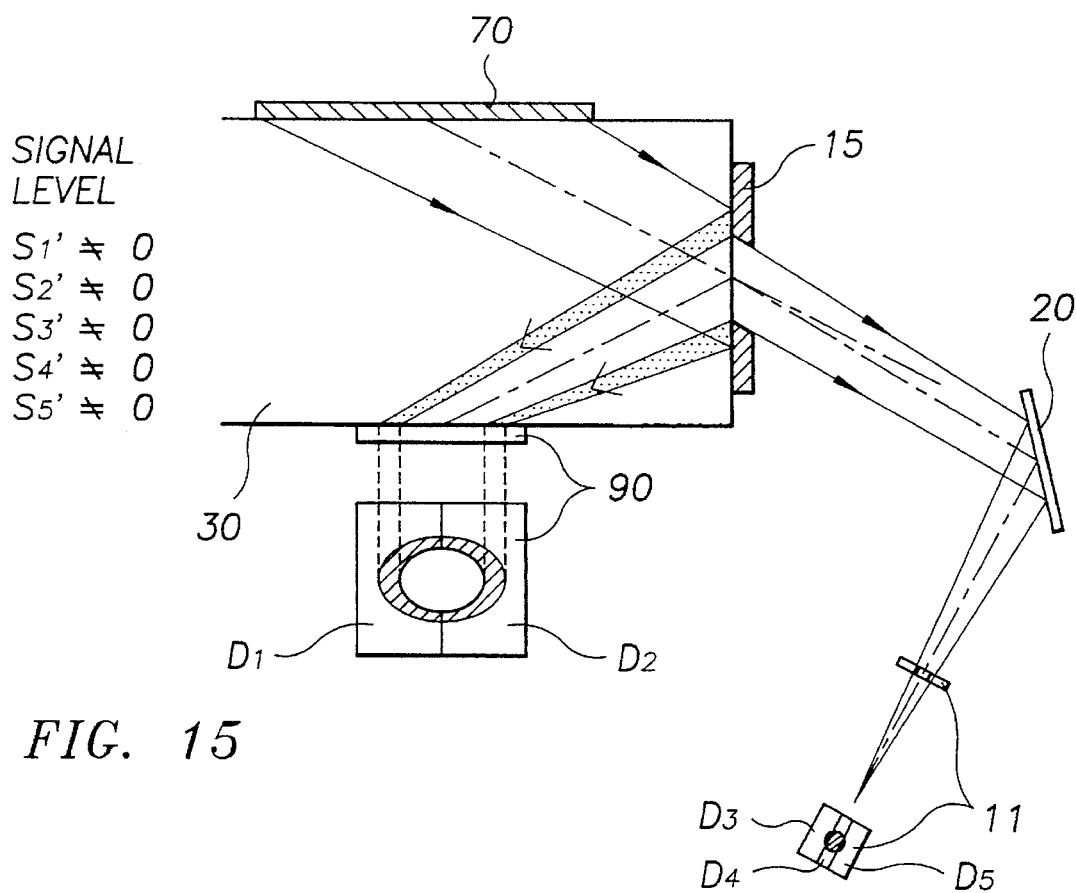
FIG. 15 is a schematic sectional view illustrating optical paths formed at conditions of FIGS. 10B and 10D.

On the other hand, when the optical disc 60 moves toward the focusing lens 50, the reflection point C moves to the point C'', as shown in FIG. 10D. Accordingly, light beams are focused to the rear of the three-component photodetector 11, as shown in FIG. 15. In this case, the photodetector components $D_3$ to $D_5$ of the three-component photodetector 11 can detect the optical signals $S_3$ to $S_5$ and thus output photodetecting signals $S_3'$ to $S_5'$, respectively. In this case, light beams passing through the reflection plate 15 have a size larger than the diameter l of the opening of reflection plate 15. As a result, the reflection plate 15 reflects a part of the light beams toward the two-component photodetector 90, so that the photodetector components $D_1$ and $D_2$ of the two-component photodetector 90 can detect the optical signals $S_1$ and $S_2$ and thus output photodetecting signals $S_1'$ and $S_2'$, respectively. That is, when all the photodetecting signals $S_1'$ and $S_2'$ from the two-component photodetector 90 and the photodetecting signals $S_3'$ to $S_5'$ from the three-component photodetector 11 are not zero (0), the optical pick-up system recognizes this case as a case that the optical disc 60 has moved toward the focusing lens 50 and thus activates the actuator 12 for shifting the focusing lens 50, so that it corrects the focusing error, so as to operate normally.

When a focusing error has occurred, the movement of the optical disc 60 away from the focusing lens 50 results in $S_1'=S_2'=0$. In this case, when $S_3'\neq 0$, $S_4'\neq 0$ and $S_5'\neq 0$, the focusing lens 50 is upwardly shifted in the y-axis direction, so as to obtain the photodetecting signals $S_3'$ and $S_5'$ of 0 ($S_3'=S_5'=0$). On the other hand, the movement of the optical disc 60 toward the focusing lens 50 results in $S_1'\neq 0$ and $S_2\neq 0$. In this case, when $S_3'\neq 0$, $S_4'\neq 0$ and $S_5'\neq 0$, the focusing lens 50 is downwardly shifted in -y-axis direction, so as to obtain the photodetecting signals $S_3'$ and $S_5'$ of 0 ($S_3'=S_5'=0$). Thus, the focusing error can be corrected.

Now, corrections for tracking errors which occur during the operation of the optical pick-up system will be described, in conjunction with FIGS. 11A to 11C, FIG. 12 and FIG. 13.

Figure 11A:
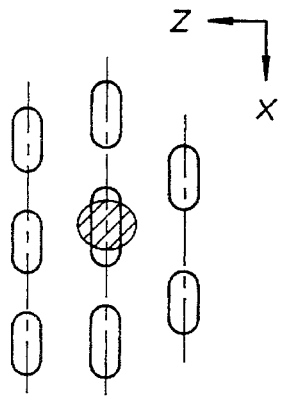
FIGS. 11A to 11C are schematic views for explaining tracking errors.
Figure 11B:
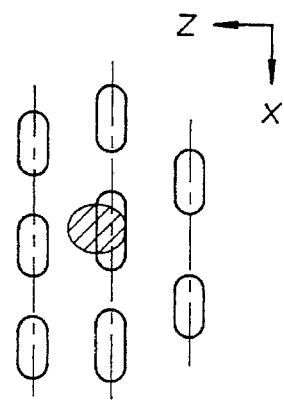
Figure 11C:
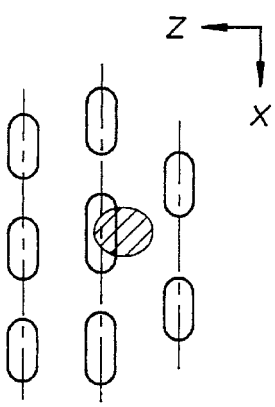

FIG. 11A shows a condition that the optical pick-up system operates normally without any tracking error, whereas FIGS. 11B and 11C show conditions that tracking errors have occurred.

Figure 12:
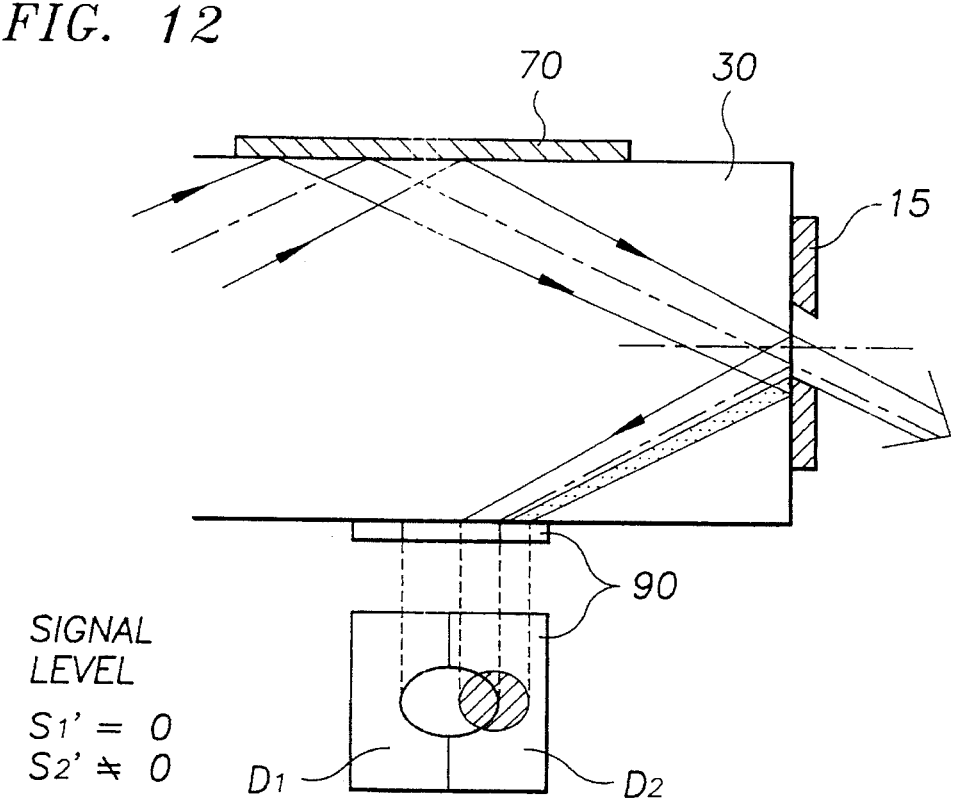
FIGS. 12 and 13 are schematic sectional views illustrating optical paths when a tracking error has occurred.

A part of the light beams are reflected by the reflection plate 15 and then fed to the two-component photodetector 90. In the case of FIG. 11B, the light beams are detected only by the photodetector component $D_2$ of the two-component photodetector 90, as shown in FIG. 12. Accordingly, the photodetector component $D_2$ outputs a photodetecting signal $S_2'$ ($S_2'\neq 0$), whereas a photodetecting signal $S_1'$ of the photodetector component $D_1$ becomes zero ($S_1'=0$). In this case, the optical pick-up system activates the actuator 12 for shifting the focusing lens 50, so as to make $S_2'=0$. Thus, the tracking error can be corrected.

Figure 13:
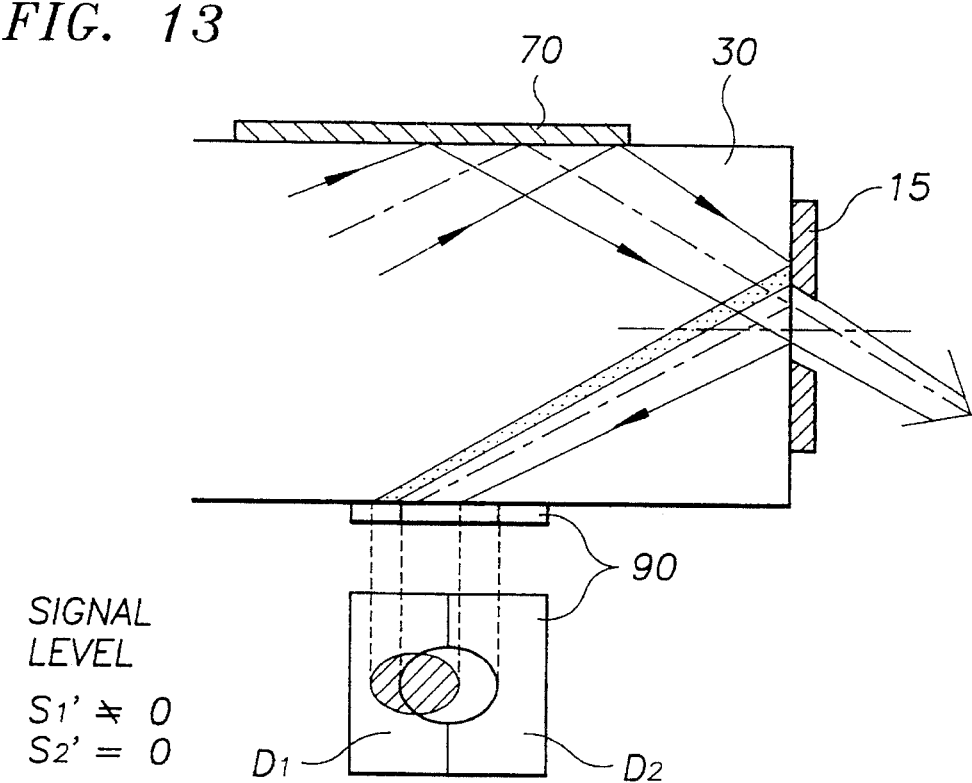

In the case of FIG. 11C, the light beams are detected only by the photodetector component $D_1$, as shown in FIG. 13. Accordingly, the photodetector component $D_1$ outputs a photodetecting signal $S_1'$ ($S_1'\neq 0$), whereas a photodetecting signal $S_2'$ of the photodetector component $D_2$ becomes zero ($S_2'=0$). In this case, the optical pick-up system activates the actuator 12 for shifting the focusing lens 50, so as to make $S_1'=0$. Thus, the tracking error can be corrected.

As apparent from the above description, even when an optical disc is subjected to a vibration caused by external noise or has a poor smoothness, the optical pick-up system according to the present invention can achieve an optical pick-up operation with an improved reliability, by sensing accurately errors caused by the vibration and poor smoothness and then correcting accurately the errors.

The present invention can also provides a small and light optical pick-up system, as compared with general optical pick-up systems. Accordingly, it is possible to make the size of the overall system compact.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pick-up system for reading information recorded on an optical disc, said system comprising:

a light source;

information reading means for reading said information recorded on said optical disc, by using light beams emitted from said light source;

error correcting means for detecting an error occurring when said information reading means reads the information and correcting said error; and supporting means for providing optical paths for said information reading means and said error correcting means and supporting both the information reading means and the error correcting means;

wherein said information reading means comprises:

a beam splitter adapted to transmit a part of incident light beams therethrough and reflect the remaining part of said incident light beams;

reflecting means adapted to reflect said light beams transmitted through said beam splitter, at a predetermined reflection angle, and reflect light beams reflected from the optical disc at a predetermined reflection angle;

collimating means for converting said light beams reflected from said reflecting means into parallel light beams; and focusing means adapted to focus said parallel light beams emerging from said collimating means onto a surface of the optical disc, and feed light beams reflected from the optical disc to the collimating means;

wherein said reflecting means comprises:

a first mirror adapted to reflect light beams from said beam splitter at a predetermined angle and light beams carrying said information recorded on said optical disc toward said error correcting means; and a second mirror adapted to reflect light beams from said first mirror toward said collimating means and information-carrying light beams from the collimating means toward the first mirror;

wherein said error correcting means comprises:

a reflection plate having a aperture surrounded by a reflector so as to reflect a part of the information-carrying light beams reflected from said information reading means at a predetermined angle, and to allow the remaining part of said information-carrying light beams to pass through said aperture;

error detecting means, comprising at least two photodetectors, adapted to detect an occurrence of an error, from said information-carrying light beams, said error detecting means comprising a first error detector adapted to detect said light beams reflected from said reflection plate and a second error detector adapted to detect said light beams passing through the reflection plate; and actuating means, adapted to adjust said information reading means, based on an error detection result obtained by said error detecting means;

wherein each of said photodetectors is adapted to detect said light beams reflected from said reflection plate when the error has occurred and not to detect the light beams at a normal operation state of said system.

* * * * *